United States Patent [19]

Tanaka et al.

[11] 4,097,366
[45] Jun. 27, 1978

[54] METHOD FOR PREVENTING THE FORMATION OF COKE DEPOSITS IN A FLUIDIZED BED REACTOR

[75] Inventors: Tsunemitsu Tanaka, Yokohama; Tetsuo Nakagawa, Fujisawa; Shiro Abiko, Tokyo; Norio Kaneko, Yokohama, all of Japan

[73] Assignees: Mitsubishi Petrochemical Company Limited, Tokyo; Chiyoda Chemical Engineering & Construction, both of Japan

[21] Appl. No.: 831,673

[22] Filed: Sep. 8, 1977

Related U.S. Application Data

[63] Continuation-in-part of Ser. No. 666,070, Mar. 11, 1976, abandoned.

[30] Foreign Application Priority Data

Mar. 1, 1975 Japan .................................. 50-28681

[51] Int. Cl.² ........................................... C10G 11/18
[52] U.S. Cl. .................................. 208/127; 208/48 R
[58] Field of Search ............................. 208/48 R, 127

[56] References Cited

U.S. PATENT DOCUMENTS

| | | | |
|---|---|---|---|
| 2,952,619 | 9/1960 | Metrailer et al. | 208/127 |
| 3,071,540 | 1/1963 | McMahon et al. | 208/48 R |
| 3,416,598 | 12/1968 | Dorn | 208/48 R |
| 3,551,513 | 12/1970 | Suzukawa et al. | 208/127 |
| 3,671,424 | 12/1968 | Dorn | 208/48 R |

Primary Examiner—Herbert Levine
Attorney, Agent, or Firm—Wenderoth, Lind & Ponack

[57] ABSTRACT

In the process of thermally cracking a heavy hydrocarbon oil by feeding said oil into a fluidized bed reactor as a high-velocity atomized gas stream by blowing said oil therein from a gas-mixing type nozzle along with an atomizing gas and carrying out the thermal cracking of the oil at above 500° C., the improvement which comprises blowing in an inert gas to the eddying part formed in the environs of said atomized gas stream in said fluidized bed reactor thereby blocking the formation of eddies to thus prevent the accumulation of coke deposits on the outside wall of said nozzle and the walls of the fluidized bed reactor in the vicinity of said nozzle.

5 Claims, 4 Drawing Figures

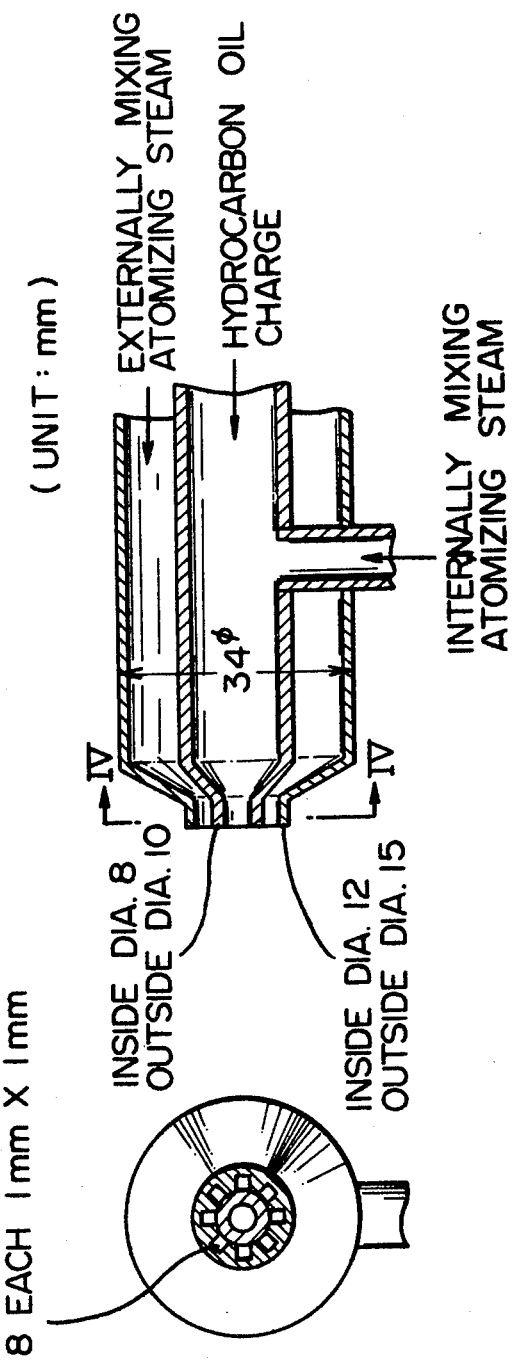

METHOD FOR PREVENTING THE FORMATION OF COKE DEPOSITS IN A FLUIDIZED BED REACTOR

CROSS REFERENCE TO RELATED APPLICATIONS

This is a continuation-in-part of U.S. application Ser. No. 666,070, filed Mar. 11, 1976 now abandoned.

FIELD OF THE INVENTION

This invention relates to a new method of preventing the formation of coke deposits on the outside wall of the feed nozzle and the walls of the fluidized bed reactor in the vicinity of the nozzle when feeding a hydrocarbon oil feedstock to the reactor using a gas-mixing type nozzle in thermally cracking a heavy hydrocarbon oil of high residual carbon content in a fluidized bed reactor.

BACKGROUND OF THE INVENTION

An extremely large amount of coke is separated out in carrying out the thermal cracking of a heavy hydrocarbon oil which has a high residual carbon content. The tubular-type thermal cracking furnace that is widely used in the thermal cracking of distillates, such as naphtha, which do not contain any residual carbon, cannot be used as the apparatus for the thermal cracking of heavy hydrocarbon oil due to clogging of the tubes of formation of coke deposits. Hence, a fluidized bed reactor is usually used. If a fluidized bed reactor is used, a major proportion of the coke formed may adhere to the particles of the fluidized bed, which adhered coke can be readily removed by a suitable method, e.g. burning. Thus, the thermal cracking of the heavy hydrocarbon oil having a high residual carbon content can be carried out with no trouble at all. The method of thermally cracking the heavy hydrocarbon oil with this type of fluidized bed reactor is known per se. For example, in Japanese Patent Publication No. 36289/70, there is suggested a method of using a two-column particle circulating-type fluidized bed reactor. This method may be outlined as follows: The reactor is made up of two columns, a heating column and a reaction column. The two columns are packed with particles of a heat transfer medium, these particles making a cyclical movement between the two columns. The heat treasfer medium particles, after being heated at the heating column, migrate to the reaction column where the particles, while providing the heat necessary to maintain the prescribed reaction temperature, are fluidized by the fluidizing gas. The heavy hydrocarbon oil charge is fed into the fluidized bed from a midpoint of the reaction column where it is thermally cracked. At this time, the coke formed adheres to the heat transfer medium particles. The heat transfer medium particles that have adhered to the coke again return to the heating column, at which time the adhered coke is removed by burning. At the same time, the heat transfer medium particles are heated by the heat evolving from the combustion. The cracked gas formed is conveyed from the top of the fluidized bed reactor to a cyclone, where the heat transfer medium particles entrained in the cracked gas are separated and removed. Following this, the gas is conveyed to a quencher and then to a distillation system, from which the product is withdrawn. The heavy hydrocarbon oil of high residual carbon content fed to the reaction column cannot be completely vaporized even though a high preheating temperature is employed. At least a part of the oil is fed in a liquid state. Howver, to ensure that the heavy hydrocarbon oil fed to the fluidized bed is promptly thermally cracked and that the coke formed readily adheres to the particles to a maximum extent, it is necessary that the liquid portion of the heavy hydrocarbon oil be fed into the fluidized bed as minute liquid drops.

A great number of methods are usually known for feeding a liquid as minute liquid drops. A typical method comprises the use of a gas-mixing type moxxle or a pressured spray nozzle. In the case of the gas-mixing type nozzle, the principal theory is that by mixing a gas and a liquid, the kinetic energy or the pressure of the gas is transformed to an energy for atomizing the liquid. The gas-mixing nozzle can be roughly classified into two types, i.e. an internal gas-mixing type nozzle and an external gas-mixing type nozzle. The internal gas-mixing type nozzle is that in which the liquid is atomized by a procedure consisting of first premixing a gas into the liquid in the passage for the liquid and then jetting the gas-mixed mixture from the end of the passage at a high velocity. On the other hand, the external gas-mixing type nozzle is that in which the liquid is atomized by a procedure consisting of immediately jetting a gas at a high velocity against the liquid subsequent to its emergence from its passage. The gas is jetted from a passage having an opening which adjoins the opening of the fluid passage, thereby effecting the atomization of the liquid. There is also a nozzle which consists of a combination of an internal gas-mixing type nozzle and an external gas-mixing type nozzle. In this case, a part of the gas is mixed internally, while the rest is mixed externally. The only difference in these gas-mixing type nozzles is that in one, the gas is mixed inside the passage while in the other, the gas is mixed outside the passage. As previously indicated, the basic theory underlying the atomization of the liquid is exactly the same. The pressurized spray nozzle is that in which the atomization of the liquid is accomplished by maintaining the feed pressure of liquid at a high level and then jetting this liquid at a high velocity from a small hole. In this case, the basic principle is that the pressure of the liquid is mainly transformed into energy for atomizing the liquid. In view of the hereinafter-given reasons, it is believed that as the nozzle for feeding a heavy hydrocarbon oil into a high temperature fluidized bed, the gas-mixing type nozzle is superior to the pressurized spray nozzle. In the first place, the viscosity of heavy hydrocarbon oil is usually high. Hence an extremely high pressure is required for use of the pressurized spray nozzle, say 20–30 kg/cm$^2$ gauge. However, in the case of the gas-mixing type nozzle, it is possible to hold the pressures of both the liquid and gas to a maximum of about 3–5 kg/cm$^2$ gauge. In the second plate, the atomized liquid drops, while entrained in the high-velocity stream, are dispersed uniformly throughout the whole reaction region of the fluidized bed, which makes this nozzle exceedingly convenient.

However, in blowing a heavy hydrocarbon oil into a fluidized bed reactor with a gas-mixing type nozzle, there is a difficulty in that great deposits of coke form on the outside wall of nozzle and the walls of the fluidized bed reactor in the vicinity of the nozzle. Such deposits of coke greatly impede the dispersion of the heavy hydrocarbon oil in the fluidized bed. Again, when the operation is carried out for a prolonger period of time, the amount deposited becomes so great that it narrows the interior of the reactor. Consequently, it is difficult to carry on the satisfactory operation of the fluidized bed. For example, in the case of a two-column particle circulating-type fluidized bed reactor, such as proposed in Japanese Patent Publication No. 36289/70, a reduction of the amount of particles circulated is brought about. As a result, it becomes impossible to maintain the prescribed reaction temperature, with the result that, at times, the operation must be stopped.

The problem of coke deposits accumulating in the vicinity of the nozzle is also seen in the case of such usual combustion apparatus as boilers, etc. There is a marked difference, however, between the combustion apparatuses and the fluidized bed reactor used in this invention with respect to the various conditions involved in feeding the feedstock and the significance of the coke deposits. That is to say, the presence or absence of particles makes for differences in the flow of the gas in the columns and the movement of the atomized heavy hydrocarbon oil drops. Consequently, the accumulation and growth of the coke deposits also differs. Again, there is also a difference in the formation of the coke deposits as a result of the difference in the reactions that proceed in the columns. One is a combustion reaction, while the other is a cracking reaction. Since oxygen is present in a combustion apparatus, it is possible to prevent the accumulation of the coke deposits to a certain extent by utilizing the combustion reaction. However, the prevention of the accumulation of the coke deposits is not an easy matter in the case of the cracking reaction, because the cracking reaction is carried out in the substantial absence of oxygen. Further, there are great differences in the methods of removing the coke deposits. In the case of a combustion apparatus, since the apparatus is usually operated at about normal atmospheric pressure, the exchange of the nozzle is extremely easy. If coke deposits take place in the vicinity of the nozzle, the usual practice is to exchange the nozzle itself. On the other hand, in the case where thermal cracking is carried out in, say, a fluidized bed reactor, as apparent from the object to be achieved, the gas formed by cracking is passed successively through a quencher as well as fractionating and purification apparatuses, with the result that the process is usually operated under superatmospheric pressure (e.g. about 1.0 kg/cm² gauge). Because of the foregoing requirements, and the fact that particles are present, the exchange of the nozzle is an extremely difficult matter.

As indicated hereinabove, the problem of coke deposits in the vicinity of the nozzle in the case of the fluidized bed reactor used in the present invention is far more difficult to solve compared with the case of the coke deposits of a combustion apparatus. Furthermore, unless this problem is solved, serious difficulties in operating the apparatus take place, as indicated hereinbefore, Hence, it is necessary to reduce the amount of coke deposits in the vicinity of the nozzle so that they will not become a substantial hindrance even though the operation is continuously carried out over a prolonged period of time, Various attempts have been made in the past to solve this problem but no effective solution has been found as yet. For instance, no matter how the conditions of operating the nozzle (e.g., the amount of gas flow, the jetting velocity of the gas, etc.) are changed, the foregoing difficulties cannot be solved.

With a view to solving the foregoing problem, detailed observations and studies concerning the heat transfer medium particles and the movement of fluid in the vicinity of the nozzle were made by us. Consequently, the mechanism of the formation of coke deposits was clarified and the present invention was perfected on the basis of what was thus found.

SUMMARY OF THE INVENTION

In the process of thermally cracking a heavy hydrocarbon oil by feeding said oil into a fluidized bed reactor as a high-velocity atomized gas stream by blowing said oil therein from a gas-mixing type nozzle along with an atomizing gas and carrying out the thermal cracking of the oil at above 500° C, there is provided in accordance with the present invention an improved method which comprises blowing in an inert gas to the eddying part formed in the environs of said atomized gas stream in said fluidized bed reactor thereby blocking the formation of eddies to thus prevent the accumulation of coke deposits on the outside wall of said nozzle and the walls of the fluidized bed reactor in the vinicity of said nozzle.

By the term "inert gas" is meant a gas per se, such as steam, which gas is free of solid particles such as the inert gas employed in the McMahon et al. U.S. Pat. No. 3,071,540.

DESCRIPTION OF THE DRAWINGS

FIG. 3 is a view of a longitudinal section of a gas-mixing type nozzle used in Examples 1 and 2 and Controls 1 and 2.

FIG. 4 is a cross-sectional view of the gas-mixing type nozzle taken along line IV — IV of FIG. 3.

DETAILED DESCRIPTION OF THE INVENTION

Figure 1:
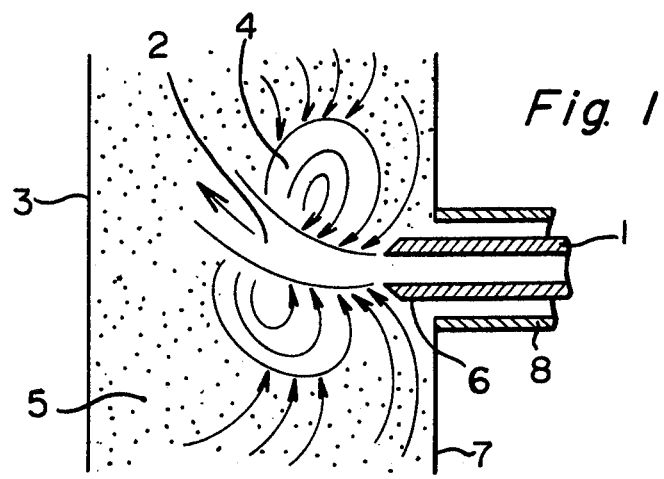
FIG. 1 is a schematic view for illustrating the mechanism of the formation of coke deposits in the vicinity of the nozzle.

First, the mechanism of the formation of coke deposits in the vicinity of the nozzle, which was discovered for the first time by the present inventors, will be explained by reference to FIG. 1. In FIG. 1, the gas-mixing type nozzle 1 is interposed in a guide tube 8. A heavy hydrocarbon oil feedstock preheated to a suitable temperature and partly gaseous and partly still in the liquid state is blown along with an atomizing gas into a reactor 3 as a high-velocity atomized gas stream. By the terminology "atomizing gas", as used herein, is meant a gas that is inert to the reaction, which is used for feeding the liquid portion of the heavy hydrocarbon oil into the reaction column in a state of minute liquid drops. On the other hand, the terminology "atomized gas stream", as used herein, denotes the stream of the minute liquid drops of the heavy hydrocarbon oil that move along with the gas. The atomized gas stream that has been blown into the reactor 3 takes the course as shown by 2 of FIG. 1, and, as shown by the arrow, moves upwardly. However, the central speed of the atomized gas stream decelerates as it proceeds down stream and its width gradually broadens. Hence, as taught by Bernoulli's theorem, the static pressure of the atomized gas stream in the vicinity of the nozzle becomes lower than that of the atomized gas stream at a downstream point remote from the nozzle (i.e. the pressure becomes relatively reduced) and, as a result, gas is sucked in a greater guantity from the environs in the vicinity of the nozzle. While there are present in the fluidized bed such various gases as the fluidizing gas, atomizing gas, the gas resulting from the vaporization of the heavy hydrocarbon oil and the cracked gas resulting from the thermal cracking of the heavy hydrocarbon oil, the concentration of the heat treasfer medium particles is relatively high at that part of the fluidized bed such as indicated by 5 in FIG. 1, a point lower than the nozzle. As a result, the flowing resistance of the gas is great, and hence the amount of the gas (principally the fluidizing gas) that is sucked in from here is restricted. On the other hand, at that part of the fluidized bed downstream (i.e. a point higher than that nozzle) of the atomized bas stream, the concentration of the heat treasfer medium particles is relatively small. Hence, the amount of gas that is sucked in from this part is greater than that of the foregoing part 5. Not only is the fluidizing gas sucked in from the environs, but also the atomizing gas from the atomized gas stream itself, the gaseous heavy hydrocarbon oil and the cracked gas are again sucked in. In addition, a part of the atomized heavy hydrocarbon oil is also sucked in. Since the amount of gas flowing into the aforementioned reduced pressure part from a point about the nozzle in a direction opposite that of the flow of the atomized gas stream is great, eddies are formed, as shown in FIG. 1, at this reduced pressure part, i.e. in the environs 4 of the atomized gas stream in the vicinity of the nozzle. A rotary movement of the coke-forming materials such as cracked gas, the gaseous heavy hydrocarbon oil and the liquid drops of the atomized heavy hydrocarbon oil repeatedly take place due to the eddies, with the consequence that the dwell time is greatly prolonged as compared with when there is no formation of eddies. Hence, the time of contact between the coke-forming materials described above and the nozzle outer wall 6 and the fluidized bed reactor walls 7 in the vicinity of the nozzle is prolonged to result in the formation of the coke deposits on the walls 6 and 7. Usually, there are numerous cases where continuous growth of the coke deposits takes place. On the other hand, when there are indented parts in the walls of the reactor, the coke deposits enter these indented parts to form a root, thus establishing a secure attachment from which they do not readily fall off.

We were the first to discover that the coke deposits in the vicinity of the nozzle occurred, as described hereinbefore, because of the formation of eddies as a result of the pressure of the environs of the atomized gas stream in the vicinity of the nozzle becoming less than that of the other parts of the fluidized bed. On the basis of this discovery, we found that an extremely effective method for preventing the formation of the coke deposits on the outer wall of the nozzle and the walls of the fluidized bed reactor in the vicinity fo the nozzle consisted of substantially reducing the formation of eddies by reducing the degree of reduced pressure of the eddying part. the present invention was thus perfected.

The heavy hydrocarbon oil used as the starting material in this invention includes such oils as petroleum crudes, shale oil, tar sand oil, tar, or those in which a part of a major portion of the light fractions has been separated and removed by distillation or other operations, e.g. atmospheric pressure residual oils, reduced pressure residual oils and asphalt. The residual carbon content of these oils is usually at least 2% by weight, and at times as high as 60% by weight or more.

In practicing the process of this invention, the fluidized bed reactor is maintained at a prescribed temperature by the heat transfer medium particles of the fluidized bed which have been heated by a suitable method. As methods for heating the heat transfer medium particles in the heating column, there can be mentioned, for example, a two-column circulating-type reactor wherein a combustion gas produced in a combustion apparatus provided outside of the heating column is blown into the heating column. Another method involves burning the fuel by blowing the fuel, oxygen or air directly into the heating column, or blowing oxygen into the heating column and burning the coke material that has adhered to the heat transfer medium particles. The fluidized bed reactor is thus maintained at a prescribed temperature by these heated particles that move therethrough. After providing the reactor with the heat required for the reaction, the cooled particles are recycled to the heating column where they are again heated.

Usable as the heat transfer medium particles are sand, refractory particles, coke particles, etc., preferably the coke particles because their attrition is less, etc. While the range of particle sizes that can be used will vary depending upon the heating method and the mode of circulation, particles of about 0.04 to 10 millimeters are usually used.

A temperature of at least 500° C. is used for thermally cracking the heavy hydrocarbon oil in the fluidized bed reactor. For example, the temperature of 500°–700° C is usually employed when the intended product is fuel oil; 700°–850° C when the intended product is the olefins; and above 900° C, usually not more than 1200° C, when the intended product is fuel gas.

The viscosity of heavy hydrocarbon oils is usually high and this viscosity is reduced by preheating. The viscosity should usually be less than 200 centipoises. A preheating temperature of 100°–350° C is usually used. A part of the charge being vaporized becomes a gas, while a part remains in its liquid state.

To ensure that the heavy hydrocarbon oil fed to the fluidized bed reactor is promptly thermally cracked and full adhesion of the coke material to the particles readily takes place, a gas-mixing type nozzle is used for atomizing the liquid portion of the starting hydrocarbon oil in the fluidized bed reactor. The gas-mixing type nozzle may be an internal gas-mixing type, an external gas-mixing type nozzle or a combination of these two types.

The gas used in the gas-mixing type nozzle (atomizing gas) is one which does not adversely affect the apparatus and its operation. For example while it is preferred that this be the same as that used for the fluidizing operation, other gases may be used as long as the reaction or the operation of the nozzle is not adversely affected. However, it must be at least in a gaseous state at the point where it commingles with the heavy oil. When considered from various standpoints, steam is most preferable. The required flow rate of the atomizing gas varies depending principally upon the physical properties of the heavy hydrocarbon oil and the distillation characteristics. That is to say, the flow rate of the atomizing gas must be greater in proportion as the viscosity of the liquid portion at the preheating temperature of the charge is higher or in proportion as the amount remaining as liquid is greater. For example, when the viscosity of the liquid portion is less than 500 centipoises, the weight flow rate (expressed, say in kg/hr) employed of the atomizing gas is 0.15 times, and preferably 0.30 times, the weight flow rate (expressed, say, in kg/hr) of the liquid portion of the heavy hydrocarbon oil charge. On the other hand, the velocity of the atomizing gas at the nozzle tip, considering the gas as being an ideal gas, is in the order of 50 meters per second – 1000 meters per second, calculated in terms of the temperature of the atomizing gas in the passage at normal atmospheric pressure. These conditions for atomizing the liquid portion of the charge are not to be construed as limiting this invention.

A fluidizing bed reactor may be provided with two or more nozzles. Further, two or more passages for the heavy hydrocarbon oil charge or two or more passages for the atomizing gas may be provided for each nozzle.

The feature of the present invention resides in blowing an inert gas (hereinafter referred to as an eddy elimination gas) into the eddying part that develops in the environs of the atomized gas stream in the vicinity of the nozzle for the purpose of preventing the formation of eddies. While the class of gas to be used for elimination of eddies is preferably the same as that of the atomizing gas, other gases may be used as long as they do not adversely affect the reaction. Since, as previously described, the eddies form in the vicinity of the nozzle, it will suffice merely to blow the eddy elimination gas into the vicinity of the nozzle for preventing the formation of the eddies. By operating in this manner, the eddy elimination gas becomes sucked into the eddying part and hence checks the formation of eddies. The nozzle is usually interposed in a guide tube from which it may be removed for cleaning. In such a case, a preferred practice is to cause the eddy elimination gas to flow through the space that exists between the nozzle and the guide tube.

For example, the inert gas is introduced between the wall of the guide tube 8 and the outer wall of the gas-mixing nozzle 1. The gas-mixing nozzle 1 is shown in FIG. 1 and its detailed structure shown in FIG. 3.

While it is possible to eliminate the eddies completely if the flow rate of the eddy elimination gas is increased beyond a certain point, it is not absolutely necessary to completely eliminate the eddies in the invention method. If the degree of reduced pressure of the eddying part is reduced beyond a certain extent as a result of blowing of the eddy elimination gas, the eddies are weakened. Consequently, it becomes possible to prevent any substantial accumulation of the coke deposits on the outside wall of the nozzle and the walls of the fluidized bed reactor in the vicinity of the nozzle. The flow rate of the eddy elimination gas required for achieving this objective will vary depending upon the reaction conditions and hence cannot be exactly prescribed. In general, however, the preferred flow rate for the eddy elimination gas is one that is at least 0.15 times, and preferably at least 0.20 times, the value obtained by adding the weight flow rate (say, kg/hr) of the atomizing gas and the weight flow rate of the gaseous portion of the hydrocarbon oil charge at its preheating temperature. On the other hand, the linear velocity of eddy elimination at the blow inlet should preferably be less than the linear velocity of the atomizing gas at the nozzle tip. More preferably, the linear velocity of the eddy elimination gas should be held in the range of 0.02 to 0.9 times the linear velocity of the atomizing gas. When the linear velocity is too great, there is the possibility of the coke deposits forming on, say, the outside wall of the passage for the eddy elimination gas as a result of the atomizing gas, the cracked gas and the atomized hydrocarbon oil charge being sucked countercurrently into the eddy elimination gas stream.

The following examples will serve to more fully illustrate the present invention.

EXAMPLE 1

Figure 2:
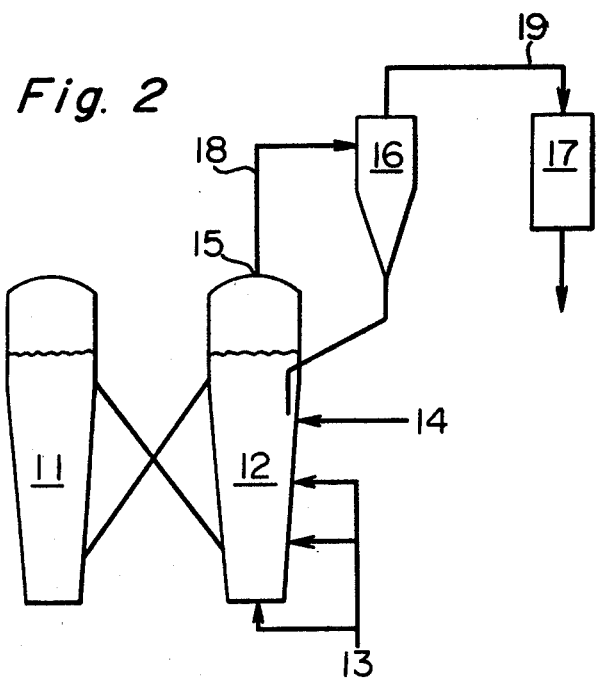
FIG. 2 is a view showing the setup of the fluidized bed reactor used in Examples 1 and 2 and Controls 1 and 2.

A heavy hydrocarbon oil was thermally cracked in a fluidized bed reactor such as shown in FIG. 2. The apparatus of FIG. 2 will be briefly described.

This apparatus is a two-column particle circulating type fluidized bed reactor such as disclosed in, say, Japanese Patent Publication No. 36289/70. The heat transfer medium particles are heated in a heating column 11 by means of a combustion waste gas that is blown thereinto. The heated heat transfer medium particles by moving to a reaction column 12 and then back to the heating column 11 circulate between the two columns. The heat transfer medium particles are fluidized by means of steam 13 that is blown into the reaction column 12 from its bottom and sides. The charge is fed from 14 and is thermally cracked in the presence of steam. The resulting cracked gas is conveyed from the top 15 of the reactor to a cyclone 16 via line 18, and the heat transfer medium particles entrained in the cracked gas are separated. The cracked gas is then conveyed to a quencher 17 via line 19 and, after being cooled at a temperature that does not set up a secondary reaction (say, less than about 350° C), conveyed to a distillation system where the several products are withdrawn.

In this experiment, coke particles having an average diameter of 0.8 millimeter were used as the heat transfer medium particles. The diameter of the reaction column was 360 millimeters. Three nozzles of the type shown in FIGS. 3 and 4 and having the same shape and dimensions were used. These three nozzles were disposed in the same sectional plane of the reaction column and such that their central axes would make a 120° angle relative to each other and that their central axes would intersect with the central axes of the reaction column. The outside diameter of nozzles used was 34 millimeters, and each of the nozzles was interposed in a guide tube of the type shown as 8 in FIG. 1 and having an inside diameter of 41.6 millimeters. Further, the front end of the nozzles was disposed flush with the inner surface of the reactor wall (i.e., so that the front end of the nozzle does not protrude into the inside of the reactor). The gas-mixing type nozzle shown in FIG. 3 is of the variable type, which can be used as either an external gas-mixing or internal gas-mixing nozzle by changing the operating conditions of the nozzle. In this experiment, this nozzle is used as an internal gas-mixing nozzle.

The feedstock used in this experiment was a vacuum distillation column residual oil of a Middle east crude, in which the penetration was 80–100 and the residual carbon content was 23 wt. %. The feedstock was preheated to 200° C and fed via three nozzles, the rate of feed to each nozzle being 50 kg/hr. No part of the feedstock vaporized at the preheating temperature, all being in a liquid state. The viscosity was 40 centipoises. The reaction conditions of the thermal cracking reaction were a temperature of 750° C and a pressure of 0.1 – 0.3 kg/cm$^2$ gauge, while the fluidizing steam amounted to 120 kg/hr. Further, steam was used as the atomizing gas, and it was fed to each nozzle at the rate of 60 kg/hr in such a manner that the nozzles would function as internal gas-mixing type nozzles. This atomizing steam, after being preheated to 250° C, was fed at a linear velocity at the nozzle tip of 790 meters per second. Steam was used as the eddy eliminated gas, and this steam was blown in from between each nozzle and its guide tube at a rate of 20 kg/hr for each nozzle. The eddy elimination steam, after being heated to 250° C, was blown in from each nozzle at a velocity of 29 meters per second. The experiment was continuously operated for 760 hours under the hereinabove-indicated conditions with no trouble at all during the operation. When the apparatus was dismantled and inspected after the operation, no accumulation of coke deposits on the outside walls of the nozzles or walls of the reactor in the vicinity of the nozzles was noted.

EXAMPLE 2

The thermal cracking operation was carried out under identical conditions as in Example 1, except that the operation conditionsof the nozzle were varied as indicated below. That is to say, while the fluidized bed reactor, feedstock, reaction conditions and the conditions of blowing of the eddy elimination gas were exactly the same as those of Example 1, the three variable gas-mixing nozzles used were all of the combined internal and external gas-mixing type. The feedstock was preheated to 200° C and then fed to each of the nozzles at a rate of 50 kg/hr. The atomizing steam amounted to a total of 60 kg/hr for each nozzle, 50 kg/hr being fed as an internally mixing atomizing steam and 10 kg/hr being fed as an externally mixing atomizing steam. The atomizing steam, after being preheatedto 250° C, was fed in the case of the internally mixing atomizing steam at a linear velocity at the nozzle tip of 659 meters per second and in the case of the externalllly mixing atomizing steam at a linear velocity at the nozzle tip of 828 meters per second. The eddy elimination steam used was the same as that used in Example 1. This steam was blown in from each nozzle at a rate of 20 kg/hr, the velocity being 29 meters per second. The operation was carried out continuously for 410 hours with no trouble at all. When the apparatus was dismantled and inspected after the operation, no accumulation of coke deposits on the outside walls of the nozzles and the walls of the rector in the vicinity of the nozzles were noted.

CONTROL 1

The experiment was operated under exactly identical conditions as in Example 1 but withoug feeding any eddy elimination steam at all. After an operation of 350 hours, the state of fluidization of the fluidized bed reactor become unsatisfactory and, in addition, there was noted a decline in the amount of particles circulating between the heating and reaction columns. Hence the operation was immediately stopped. When the apparatus was dismantled and inspected, it was seen that the coke deposits whose growth had started in the vicinity of the nozzles had become a mass so huge as to cover almost the whole of the reactor cross section.

CONTROL 2

The experiment was operated under exactly identical conditions as in Example 2, but without feeding any eddy elimination steam at all. After an operation time of 210 hours, the apparatus was stopped,though the operation was proceeding normally. When the apparatus was dismantled and inspected, the coke deposits had grown for a distance of about 50-100 millimeters from the tip of the nozzle in a conical shape. It could thus be presumed that the coke deposits would grow into one of such immensity as that of Control 1, if the operation were to be continued for a longer period of time.

What is claimed is:

1. In the process of thermally cracking a heavy hydrocarbon oil by feeding said oil into a fluidized bed reactor as a high-velocity atomized gas stream by blowing said oil therein from a gas-mixing type nozzle along with an atomizing gas and carrying out the thermal cracking of the oil at above 500° C in the substantial absence of oxygen, said fluidized bed containing heat transfer particles therein fluidized by means of a fluidizing gas, the improvement which comprises blowing in a particle-free inert gas to the eddying part formed in the environs of said atomized gas steam in said fluidized bed reactor at a velocity sufficient to block the formation of eddies, thereby preventing the accumulation of coke deposits on the outside wall of said nozzle and the walls of the fluidized bed reactor in the vicinity of said nozzle, said heavy hydrocarbon oil, atomizing gas and particle-free inert gas being introduced into the fluidized bed reactor at a point above the point wherein the fluidizing gas is introduced into the reactor.

2. The process of claim 1, wherein said atomizing gas is steam.

3. The process of claim 1, wherein said inert gas is steam.

4. The process of claim 1, wherein the linear velocity of said inert gas at the point from which it is blown in is less than the linear velocity of said atomizing gas at the nozzle tip.

5. The process of claim 1, wherein the linear velocity of the inert gas is 0.02 to 0.9 times the linear velocity of the atomizing gas.

* * * * *

UNITED STATES PATENT OFFICE
CERTIFICATE OF CORRECTION

Patent No. 4,097,366  Dated June 27, 1978

Inventor(s) Tsunemitsu Tanaka et al.

It is certified that error appears in the above-identified patent and that said Letters Patent are hereby corrected as shown below:

First page, section "[73] Assignees", change

"Chiyoda Chemical Engineering & Construction" to

-- Chiyoda Chemical Engineering & Construction Co., Ltd. --.

Signed and Sealed this

Thirteenth Day of February 1979

[SEAL]

Attest:

RUTH C. MASON  
Attesting Officer

DONALD W. BANNER  
Commissioner of Patents and Trademarks